(12) United States Patent
Klingmann et al.

(10) Patent No.: US 8,640,440 B2
(45) Date of Patent: *Feb. 4, 2014

(54) REMOVAL OF PARTICULATES FROM THE EXHAUST GAS OF INTERNAL COMBUSTION ENGINES OPERATED WITH A PREDOMINANTLY STOICHIOMETRIC AIR/FUEL MIXTURE

(75) Inventors: Raoul Klingmann, Alzenau (DE); Martin Roesch, Rodgau (DE); Dieter Lindner, Hanau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 456 days.

This patent is subject to a terminal disclaimer.

(21) Appl. No.: 12/678,431

(22) PCT Filed: Apr. 16, 2008

(86) PCT No.: PCT/EP2008/003015
§ 371 (c)(1),
(2), (4) Date: Jul. 8, 2010

(87) PCT Pub. No.: WO2009/043390
PCT Pub. Date: Apr. 9, 2009

(65) Prior Publication Data
US 2010/0275579 A1 Nov. 4, 2010

(30) Foreign Application Priority Data
Sep. 28, 2007 (EP) .................................... 07019107

(51) Int. Cl.
| | | |
|---|---|---|
| F01N 3/00 | (2006.01) |
| B01D 53/00 | (2006.01) |
| B01J 8/00 | (2006.01) |
| C01B 21/00 | (2006.01) |
| C01B 23/00 | (2006.01) |
| C01B 25/00 | (2006.01) |
| C01B 31/00 | (2006.01) |
| C01B 33/00 | (2006.01) |
| C01B 35/00 | (2006.01) |
| C01G 28/00 | (2006.01) |
| C01G 30/00 | (2006.01) |
| B01D 50/00 | (2006.01) |
| B01D 53/34 | (2006.01) |
| B01J 23/00 | (2006.01) |
| B01J 21/00 | (2006.01) |

(52) U.S. Cl.
USPC .... 60/274; 423/213.5; 423/213.7; 423/239.1; 423/245.1; 423/247; 422/170; 422/177; 422/180; 502/302; 502/303; 502/304; 502/324; 502/327; 502/328; 502/332; 502/333; 502/334; 502/339; 502/349; 502/355; 502/415; 502/439; 502/527.12; 502/527.13; 502/527.18; 502/527.19

(58) Field of Classification Search
USPC ......... 502/302–304, 324, 327, 328, 332–334, 502/339, 349, 355, 415, 439, 527.12, 502/527.13, 527.18, 527.19; 422/170–180; 60/274; 423/213.5, 213.7, 239.1, 423/245.1, 247

See application file for complete search history.

(56) References Cited

U.S. PATENT DOCUMENTS

| | | | | |
|---|---|---|---|---|
| 4,153,579 | A | * | 5/1979 | Summers et al. ............. 502/304 |
| 4,617,289 | A | * | 10/1986 | Saito et al. .................... 502/339 |
| 4,749,671 | A | * | 6/1988 | Saito et al. ...................... 502/64 |
| 5,157,007 | A | * | 10/1992 | Domesle et al. ................ 502/66 |
| 5,179,059 | A | | 1/1993 | Domesle et al. |
| 5,407,880 | A | * | 4/1995 | Ikeda et al. ..................... 502/67 |
| 5,462,907 | A | * | 10/1995 | Farrauto et al. .............. 502/304 |
| 5,593,647 | A | * | 1/1997 | Kirby ............................ 422/180 |
| 5,597,771 | A | * | 1/1997 | Hu et al. ....................... 502/304 |
| 6,022,825 | A | * | 2/2000 | Andersen et al. ............. 502/303 |
| 6,080,375 | A | * | 6/2000 | Mussmann et al. ........ 423/213.5 |
| 6,087,298 | A | * | 7/2000 | Sung et al. .................... 502/328 |
| 6,103,660 | A | | 8/2000 | Yperen et al. |
| 6,150,288 | A | * | 11/2000 | Suzuki et al. ................. 501/105 |
| 6,182,443 | B1 | * | 2/2001 | Jarvis et al. .................... 60/274 |
| 6,261,989 | B1 | * | 7/2001 | Tanaka et al. ................. 502/217 |
| 6,294,140 | B1 | * | 9/2001 | Mussmann et al. ........ 423/213.5 |
| 6,306,794 | B1 | * | 10/2001 | Suzuki et al. ................. 502/304 |

| | | | | |
|---|---|---|---|---|
| 6,348,430 B1* | 2/2002 | Lindner et al. | 502/304 |
| 6,375,910 B1* | 4/2002 | Deeba et al. | 423/239.1 |
| 6,413,483 B1* | 7/2002 | Brisley et al. | 423/239.1 |
| 6,413,904 B1* | 7/2002 | Strehlau et al. | 502/328 |
| 6,432,859 B1* | 8/2002 | Iwakuni et al. | 502/66 |
| 6,514,905 B1* | 2/2003 | Hanaki et al. | 502/328 |
| 6,645,439 B2* | 11/2003 | Zhang et al. | 422/177 |
| 6,753,294 B1* | 6/2004 | Brisley et al. | 502/439 |
| 6,764,665 B2* | 7/2004 | Deeba et al. | 423/239.1 |
| 6,808,687 B1 | 10/2004 | Uenishi et al. | |
| 6,916,450 B2* | 7/2005 | Akama et al. | 422/180 |
| 6,967,186 B2* | 11/2005 | Takaya et al. | 502/325 |
| 7,022,646 B2* | 4/2006 | Li | 502/339 |
| 7,081,430 B2* | 7/2006 | Uenishi et al. | 502/327 |
| 7,189,375 B2* | 3/2007 | Molinier et al. | 422/171 |
| 7,204,965 B2* | 4/2007 | Okawara et al. | 422/177 |
| 7,214,331 B2* | 5/2007 | Jiang et al. | 252/373 |
| 7,229,597 B2* | 6/2007 | Patchett et al. | 422/177 |
| 7,306,771 B2* | 12/2007 | Okawara | 422/177 |
| 7,329,629 B2* | 2/2008 | Gandhi et al. | 502/325 |
| 7,384,612 B2* | 6/2008 | Ajisaka et al. | 422/177 |
| 7,431,749 B2* | 10/2008 | Kim et al. | 55/523 |
| 7,481,983 B2* | 1/2009 | Patchett et al. | 422/180 |
| 7,517,510 B2* | 4/2009 | Chen et al. | 423/213.2 |
| 7,550,124 B2 | 6/2009 | Chen et al. | |
| 7,550,134 B2* | 6/2009 | Bonda et al. | 424/59 |
| 7,576,031 B2* | 8/2009 | Beutel et al. | 502/339 |
| 7,611,680 B2* | 11/2009 | Jia et al. | 422/177 |
| 7,622,096 B2* | 11/2009 | Deeba et al. | 423/213.2 |
| 7,625,529 B2* | 12/2009 | Ohno et al. | 422/180 |
| 7,638,460 B2* | 12/2009 | Nakamura et al. | 502/326 |
| 7,673,448 B2* | 3/2010 | Voss et al. | 60/297 |
| 7,678,347 B2* | 3/2010 | Chen | 422/180 |
| 7,704,473 B2* | 4/2010 | Ikeda et al. | 423/213.2 |
| 7,709,414 B2* | 5/2010 | Fujdala et al. | 502/326 |
| 7,722,829 B2* | 5/2010 | Punke et al. | 422/180 |
| 7,737,077 B2* | 6/2010 | Kitamura et al. | 502/326 |
| 7,740,809 B2* | 6/2010 | Suwabe et al. | 422/180 |
| 7,749,472 B2* | 7/2010 | Chen et al. | 423/213.2 |
| 7,795,172 B2* | 9/2010 | Foong et al. | 502/327 |
| 7,799,298 B2* | 9/2010 | Pfeifer et al. | 423/213.2 |
| 7,875,250 B2* | 1/2011 | Nunan | 422/177 |
| 7,919,051 B2* | 4/2011 | Li et al. | 422/171 |
| 7,923,408 B2* | 4/2011 | Takahashi et al. | 502/327 |
| 7,951,338 B2* | 5/2011 | Miyairi et al. | 422/177 |
| 8,007,750 B2* | 8/2011 | Chen et al. | 423/239.1 |
| 8,119,075 B2* | 2/2012 | Dettling et al. | 422/180 |
| 8,389,432 B2* | 3/2013 | Mußmann et al. | 502/60 |
| 2004/0065078 A1 | 4/2004 | Schafer-Sindlinger | |
| 2004/0198595 A1* | 10/2004 | Chen | 502/328 |
| 2005/0164879 A1* | 7/2005 | Chen | 502/328 |
| 2006/0057046 A1 | 3/2006 | Punke et al. | |
| 2006/0128562 A1 | 6/2006 | Miyoshi et al. | |
| 2006/0133969 A1 | 6/2006 | Chiffey et al. | |
| 2006/0270549 A1 | 11/2006 | Sato et al. | |
| 2007/0155624 A1* | 7/2007 | Wakita et al. | 502/304 |
| 2007/0269353 A1* | 11/2007 | Li et al. | 422/176 |
| 2008/0120970 A1* | 5/2008 | Hilgendorff et al. | 60/299 |
| 2009/0285736 A1 | 11/2009 | Schafer-Sindlinger et al. | |
| 2010/0263357 A1 | 10/2010 | Lindner et al. | |

FOREIGN PATENT DOCUMENTS

| | | |
|---|---|---|
| CA | 2 271 818 | 11/1999 |
| DE | 100 24 994 | 1/2001 |
| EP | 0 441 173 A1 | 8/1991 |
| EP | 0 885 650 | 12/1998 |
| EP | 1 669 135 | 6/2002 |
| EP | 1 300 193 | 4/2003 |
| EP | 0 957 064 | 10/2003 |
| EP | 1 726 359 | 11/2006 |
| EP | 1 974 809 | 10/2008 |
| WO | 00/29726 | 5/2000 |
| WO | 02/26379 | 4/2002 |

OTHER PUBLICATIONS

International Search Report for PCT/EP2008/003015 mailed Aug. 4, 2009.

PCT Notification of Transmittal of Translation of International Preliminary Report (Form PCT/IB/338) for PCT/EP2008/003015 mailed Jun. 10, 2010 (in English language).

PCT International Preliminary Report on Patentability (Form PCT/IB/373) for PCT/EP2008/003015 dated Jun. 1, 2010 (in English language).

PCT Written Opinion of the International Searching Authority (Form/ISA/237) for PCT/EP2008/003015 dated Jun. 1, 2010 (in English language).

PCT Notification of Transmittal of Translation of International Preliminary Report on Patentability (Form PCT/IB/338) for International Appl No. PCT/EP2007/005661 dated Jan. 22, 2009.

PCT International Preliminary Report on Patentability (Form PCT/IB/373) for International Appl No. PCT/EP2007/005661 dated Jan. 13, 2009.

PCT Written Opinion of the International Searching Authority (Form PCT/ISA/237) for International Appl No. PCT/EP2007/005661 dated Jan. 12, 2009.

* cited by examiner

*Primary Examiner* — Cam N. Nguyen
(74) *Attorney, Agent, or Firm* — Smith, Gambrell & Russell, LLP (57) ABSTRACT

Disclosed herein is a catalytically active particulate filter, an exhaust gas cleaning system and a process for cleaning the exhaust gases of predominantly stoichiometrically operated internal combustion engines, which are suitable, as well as the gaseous CO, HC and $NO_x$ pollutants, also for removing particulates from the exhaust gas. The particulate filter comprises a filter body and a catalytically active coating consisting of two layers. The first layer is in contact with the incoming exhaust gas, the second layer with the outgoing exhaust gas. Both layers contain alumina. The first layer contains palladium. The second layer contains, in addition to rhodium, an oxygen-storing cerium/zirconium mixed oxide.

34 Claims, 4 Drawing Sheets

REMOVAL OF PARTICULATES FROM THE EXHAUST GAS OF INTERNAL COMBUSTION ENGINES OPERATED WITH A PREDOMINANTLY STOICHIOMETRIC AIR/FUEL MIXTURE

INTRODUCTION AND BACKGROUND

The invention relates to a catalytically active particulate filter which is suitable especially for the removal of particulates from the exhaust gas of internal combustion engines operated predominantly with a stoichiometric air/fuel mixture. The invention also provides a process for removing particulates, carbon monoxide, hydrocarbons and nitrogen oxides from the exhaust gas of internal combustion engines operated with a predominantly stoichiometric air/fuel mixture, and a device suitable for this purpose.

Exhaust gases from internal combustion engines operated with a predominantly stoichiometric air/fuel mixture are cleaned in conventional methods with the aid of three-way catalytic converters. These are capable of converting the three essentially gaseous pollutants of the engine, specifically hydrocarbons, carbon monoxide and nitrogen oxides, simultaneously to harmless components. Apart from the gaseous hydrocarbon (HC), carbon monoxide (CO) and nitrogen oxide ($NO_x$) pollutants, the exhaust gas of gasoline engines also contains ultrafine particulate matter (PM), which results from the incomplete combustion of the fuel and consists essentially of soot.

In contrast to the particulate emission from diesel engines, the particulates in the exhaust gas of predominantly stoichiometrically operated gasoline engines are very small, i.e. they have an average particle size less than 1 μm. Typical particle sizes are in the range from 10 to 100 nm. Owing to the endangerment potential emanating from respirable ultrasmall particulates ("fine dust"), the introduction of the EU-5 exhaust gas standard in Europe from 2010 will impose a limit to the permitted particulate emission for gasoline engines too. Owing to the switchover in the particulate measurement method from methods which detect the particulate mass to particulate counting methods, a changeover in the limit from the particulate mass limit to a more critical particulate number limit can be expected for the subsequent European exhaust gas standard EU-6. Accordingly, future exhaust gas cleaning concepts for stoichiometrically operated internal combustion engines will also have to include effective devices for removing particulates.

Methods and devices for removing particulates from the exhaust gas of diesel engines are well known. These include catalytically active diesel particulate filters, catalytic coatings on particulate filters for diesel exhaust gas cleaning methods usually being oxidation catalysis coatings which serve in particular to facilitate the combustion of the soot particulates to be deposited on the filter and thus lower the soot ignition temperature. The lowering of the soot ignition temperature lowers the "balance point temperature" (BPT) which is characteristic of the filter. "Balance point temperature" (BPT) refers to the temperature at which the amount of particulates accumulated in the filter per unit time corresponds to the amount of particulates burnt off per unit time. The BPT is a parameter which is characteristic of the catalytically activated filter and depends on the selected operating point of the engine and on the exhaust gas temperature, the exhaust gas mass flow and the composition of the exhaust gas on entry to the filter.

WO 00/29726 describes a device for cleaning diesel exhaust gases in which a catalytically active filter is present. The filter comprises a first catalyst which contains a first platinum group metal and a first cerium compound. The device also contains a second catalyst which contains a second cerium compound. Embodiments are described in which both catalysts are arranged on the filter substrate. The system is notable in that, with the aid of the cerium compound present in the second catalyst, the volatile organic fraction (VOF) adhering to the soot particulates in the diesel particulate mass can be removed by oxidation. Therefore, in the particularly preferred embodiments, the second catalyst is arranged upstream of the catalytically active diesel particulate filter.

WO 02/26379 to this applicant describes a process for reducing the level of carbon monoxide, hydrocarbons and soot particulates in the exhaust gas of lean burn engines using a particulate filter, wherein the soot particulates have a soot ignition temperature $T_z$ and the particulate filter is regenerated from time to time by raising the temperature of the particulate filter above the soot ignition temperature and combusting the soot particulates. The particulate filter used is provided with a catalytically active coating which, to reduce the ignition temperature of the soot, comprises at least one oxygen-storing component and at least one of the platinum group metals platinum, palladium and rhodium. In a preferred embodiment of the particulate filter, the coating contains a second group of compounds which serves to oxidize carbon monoxide and hydrocarbons and contains at least one of the platinum group metals platinum, palladium and rhodium supported on a support material selected from a group consisting of alumina, silica, titania, zirconia, zeolite and mixtures thereof. The two substance groups are preferably arranged in two separate layers one on top of the other, the coating which is active in terms of oxidation catalysis being applied directly to the inflow channels of the filter substrate and the coating which reduces the soot ignition temperature being arranged directly thereon, such that the exhaust gas to be cleaned first comes into contact with the coating which lowers the soot ignition temperature.

The lowering of the soot ignition temperature is of particular significance in the case of use of particulate filters to clean diesel exhaust gases, since, owing to the "cold" combustion profile in the diesel engine, the implementation of temperatures above 400° C. in the downstream exhaust gas system is frequently difficult. Accordingly, there is a number of further patent applications which have particulate filters with a coating which is active in terms of oxidation catalysis and/or a coating which lowers the soot ignition temperature for their subject matter. Some applications, for example US 2006/0057046 A1, additionally take account of the exhaust gas backpressure problems of filter substrates. In this context, special three-dimensional arrangements of the catalytic coating are used to obtain very substantially homogeneous flow of the exhaust gas through the filter walls over the entire length of the component.

In the removal of particulates from the exhaust gas of predominantly stoichiometrically operated gasoline engines, there are significant differences with regard to the exhaust gas temperature, the exhaust gas composition and the nature of the particulates. These have to be reflected in a suitable exhaust gas cleaning concept.

As already described, particulates in the emissions of a gasoline engine have a much smaller average particulate size. This leads to the effect that not all filter bodies known in the prior art are suitable for cleaning the exhaust gas to very substantially eliminate particulate emissions, and it is instead necessary to use substrates which are not permeable even to ultrafine particulates. Accordingly, US 2006/0133969 A1 describes an exhaust gas system for internal combustion engines which comprises a catalyzed ceramic wall flow filter provided with a washcoat composition which comprises an oxidation catalyst and a nitrogen oxide adsorber, wherein the uncoated ceramic wall flow filter has a porosity of >40% and an average pore size of 8-25 µm, and the washcoat composition has a D50 less than/equal to 8 µm. The washcoat composition comprises platinum and/or palladium as an active component in terms of oxidation catalysis, and a metal oxide of a metal selected from the group of the alkali metals, the alkaline earth metals and the rare earth metals or mixtures thereof as the nitrogen oxide adsorber. In one embodiment, rhodium is applied to the outlet channels of the filter. The catalytically activated filter described in US 2006/0133969 is an "$NO_x$ particulate trap" (NPT), which is suitable especially for removing particulates and nitrogen oxides from the exhaust gas of predominantly lean burn diesel and gasoline engines and should be operated cyclically with cycles of rich and lean exhaust gas.

Gasoline engines which are operated with a predominantly stoichiometric air/fuel mixture usually have significantly higher exhaust gas temperatures than lean burn engines. Therefore, a catalytically coated particulate filter which is used to clean exhaust gases of predominantly stoichiometrically operated internal combustion engines must in particular feature a high thermal aging stability. More particularly, such a particulate trap must withstand temperatures up to 1100° C. even over a prolonged period and significant temperature changes with sufficient catalytic activity. The catalytically activated diesel particulate filters known from the prior art generally do not satisfy these requirements.

EP 1 300 193 A1 to this applicant describes a process for catalytic conversion of pollutants in the exhaust gas of internal combustion engines, wherein the exhaust gas passes through a porous support body wall which has an open pore structure and is optionally coated catalytically on both sides. The support body itself may consist of catalytically active material. A particular embodiment of the process is suitable for cleaning the exhaust gases of stoichiometrically operated internal combustion engines. In this case, a substrate is provided with a three-way catalytic converter coating which can simultaneously convert nitrogen oxides, hydrocarbons and carbon monoxide.

SUMMARY OF THE INVENTION

It is an object of the present invention to provide a catalytically active particulate filter which removes particulates and the gaseous hydrocarbon (HC), carbon monoxide (CO) and nitrogen oxide ($NO_x$) pollutants from the exhaust gas of predominantly stoichiometrically operated internal combustion engines and has sufficient thermal aging stability at temperatures up to 1100° C. and high thermal cycling stability. It is a further object of the present invention to provide an apparatus and a process for removing particulates, hydrocarbons (HC), carbon monoxide (CO) and nitrogen oxides ($NO_x$), which allows the exhaust gases of predominantly stoichiometrically operated internal combustion engines to be cleaned in such a way as to comply with future legal exhaust gas standards.

This object is achieved by a catalytically active particulate filter which comprises a filter body and a catalytically active coating, the catalytically active coating consisting of two layers which both comprise an active alumina. The layers are arranged such that the first layer is directly contacted by the incoming exhaust gas, while the second layer is in direct contact with the outgoing exhaust gas. The catalytically active particulate filter is characterized in that the alumina in the first layer is catalytically activated with palladium, while the second layer comprises rhodium as the catalytically active component and additionally an oxygen-storing cerium/zirconium mixed oxide.

In the context of this document, incoming exhaust gas and outgoing exhaust gas are distinguished primarily in that the outgoing exhaust gas comprises fewer particulates than the incoming exhaust gas or is substantially free of particulates.

A significant difference between the exhaust gas of lean burn engines and predominantly stoichiometrically operated gasoline engines is the oxygen content of the exhaust gas. While the exhaust gas of lean burn engines may contain up to 15% by volume of oxygen, the exhaust gas of predominantly stoichiometrically operated gasoline engines is generally notable for low oxygen content. As a result, the use of a coating which lowers the soot ignition temperature has substantially no effect, since the exhaust gas does not contain sufficient oxidizing agent for soot burnoff at reduced temperature. Since, on the other hand, only small amounts of soot are present in the exhaust gas of predominantly stoichiometrically operated internal combustion engines, the filter should be configured such that as large an amount of soot as possible can be burnt off permanently at temperatures above the soot ignition temperature with the usually present amounts of oxygen of about 0.7% by volume. In order not to hinder permanent soot burnoff by oxygen storage effects, which are entirely desirable in the conversion of HC and CO in slightly rich operating phases, a preferred configuration of the invention is therefore that when the first layer contacted directly by the incoming exhaust gas does not comprise any oxygen-storing cerium/zirconium mixed oxide.

The support oxide used for the catalytically active noble metal in the first layer in contact with the incoming exhaust gas is an active alumina. In the second layer in contact with the outgoing exhaust gas, the catalytically active noble metal can also be applied to the oxygen-storing cerium/zirconium mixed oxide.

Preference is given to using active aluminas which are stabilized with from 1 to 10% by weight of lanthanum oxide, based on the total weight of the alumina. These usually doped aluminas have a significantly higher surface stability at high temperatures than pure alumina.

Palladium is applied to the active alumina of the first layer. According to the process described in U.S. Pat. No. 6,103,660, palladium is preferably deposited from palladium nitrate using barium hydroxide or strontium hydroxide as a base. The suspension thus obtained can be used immediately to coat the filter body. The layer applied is subsequently dried and optionally calcined. The amount of the palladium in the suspension and the amount of the coating suspension are selected such that the concentration of the palladium in the first layer, after drying and calcination, is between 0.1 and 10 g/l, preferably between 0.5 and 8 g/l, based on the volume of the particulate filter.

The use of barium hydroxide or strontium hydroxide as a base for the precipitation of palladium nitrate leads, after calcination, to barium oxide or strontium oxide remaining deposited on the surface of the active alumina in the first layer.

Alternatively to the procedure described, the noble metals can also be deposited separately onto any solid component of the catalyst. Only thereafter are, for example, alumina activated with palladium or rhodium or cerium/zirconium mixed oxide activated with rhodium suspended in water in the ratios required for the layer to be produced and applied to the filter body. Such a procedure enables the concentration firstly of the catalytically active noble metals on alumina and secondly of cerium/zirconium mixed oxide to be adjusted in a controlled manner, which can be advantageous especially for the aging stability of the second layer which is directly contacted by the outgoing exhaust gas. For the separate deposition of the noble metals onto alumina and/or cerium/zirconium mixed oxide, preference is given to employing the process described in EP 0 957 064.

Irrespective of the method of introduction of the noble metal in the second layer, the amount of rhodium in the coating suspension and the amount of the coating suspension itself should be selected such that the concentration of the rhodium in the second layer of the finished particulate filter is between 0.01 and 1 g/l, preferably between 0.03 and 0.5 g/l, based on the volume of the particulate filter.

The noble metal concentrations which should actually be used are determined primarily by the desired conversion rates of the gaseous carbon monoxide (CO), hydrocarbon (HC) and nitrogen oxide ($NO_x$) pollutants. However, they also influence the BPT of the resulting catalytically activated particulate filter. In the case of special activity and aging stability requirements, specific embodiments of the catalytically active filter may comprise platinum in one layer or in both layers in addition to palladium or rhodium. In that case, preference is given to catalytically activating the active alumina of the first layer and/or the active alumina of the second layer and/or the oxygen-storing cerium/zirconium mixed oxide of the second layer additionally with platinum. The concentration of the platinum is selected such that it is in each case from 0.01 to 10 g/l in the first layer and/or in the second layer, based in each case on the volume of the particulate filter.

To further improve the lifetime of the catalytically active filter, especially with regard to thermal stability and thermal cycling stability, the addition of oxidic assistants in the coatings may be advantageous. For instance, preferred embodiments of the inventive particulate filter additionally comprise lanthanum oxide or neodymium oxide in the first layer and/or additionally comprise zirconium oxide in the second layer. The zirconium oxide is preferably stabilized with from 1 to 30% by weight of rare earth metal oxide, based on the total weight of the zirconium oxide, not more than 15% by weight of cerium oxide, based on the total weight of the stabilized zirconium oxide, being present in particularly suitable embodiments.

The inventive particulate filter may, as well as particulates, also remove the gaseous hydrocarbon (HC), carbon monoxide (CO) and nitrogen oxide ($NO_x$), pollutants from the exhaust gas. Since the exhaust gas of predominantly stoichiometrically operated internal combustion engines, at not more than 0.7% by volume of $O_2$, contains only small amounts of oxygen, the selection of a suitable oxygen storage material is important. In order not to impair the capacity of the particulate filter for permanent soot particle burnoff, the first layer in direct contact with the incoming exhaust gas may be free of an oxygen-storing cerium/zirconium mixed oxide. The second layer in contact with the outgoing exhaust gas which has been cleaned to remove particles contains an oxygen-storing cerium/zirconium mixed oxide and thus ensures the three-way catalytic activity which is needed for conversion of the gaseous CO, HC and $NO_x$ pollutants in the catalytically activated particulate filter. In the second layer, preference is given to using a cerium/zirconium mixed oxide stabilized with from 1 to 15% by weight of metal oxides, more preferably from 5 to 10% by weight, based on the total weight of the mixed oxide. The oxides are preferably those of metals selected from the group consisting of iron, manganese, titanium, silicon, tin, yttrium, lanthanum, praseodymium, neodymium, samarium, or mixtures thereof. Very suitable cerium/zirconium mixed oxides are those having a weight ratio of cerium oxide to zirconium oxide of from 1 to 0.1, especially from 0.8 to 0.2. The specific surface area of these materials is advantageously in the range between 50 and 100 $m^2/g$.

The particulates present in the exhaust gas of internal combustion engines operated predominantly with a stoichiometric air/fuel mixture generally have smaller mean particulate sizes than the particulates present in the exhaust gas of diesel engines. This has to be taken into account when selecting the filter body. Suitable filter bodies are selected from the group of the ceramic wall flow filter substrates, the sintered metal filter bodies and the ceramic and metallic foam structures. Especially in the case of foam structures and sintered metal filter bodies, the pore size must not be selected at too high a level in order to achieve adequate filtering action. The filter body is preferably selected from the group of the ceramic wall flow filter substrates. In particular, suitable ceramic wall flow filter substrates are those whose walls have an open-pore structure having a porosity of from 40 to 80%, preferably from 45 to 65%, and a mean pore diameter of from 9 to 30 micrometers. Particular preference is given to wall flow filter substrates having a mean pore diameter of from 9 to 22 μm, and in the case of particularly fine particulates from 9 to 18 μm.

Two catalytically active layers are applied to the filter body of the inventive catalytically active particulate filter. The arrangement of the layers is not arbitrary, but rather has to be selected so as to satisfy the high demands on the aging stability with minimum generation of exhaust gas backpressure as a result of the component. The following points should be given particular consideration in the selection of the coating arrangement:

the catalytically coated filter should exhibit good CO, HC and $NO_x$ conversions at an oxygen content of not more than 0.7% by volume in the exhaust gas even after prolonged thermal stress at temperatures of up to 1100° C. The high three-way activity required in the catalytically active particulate filter after thermal aging can be achieved in the case of spatial separation of the catalytically active palladium and rhodium components. Spatial proximity of the two noble metals can lead to the formation of relatively catalytically inactive alloys at relatively high temperatures.

In order to minimize the exhaust gas backpressure which is generated by the component and leads to losses in the engine power utilizable for the power train, the layers have to be arranged such that they offer as little flow resistance as possible to the exhaust gas. In spite of this, the contact times of the exhaust gas with the catalytically active components must be long enough to ensure sufficient space-time yields even in the case of high superficial velocities.

The low oxygen contents in the exhaust gas must be utilized as effectively as possible. This should be considered in the arrangement of the oxygen storage materials.

The inventive catalytically active particulate filter comprises palladium as the catalytically active component in a first layer. This layer should be arranged such that it is in direct contact with the incoming, i.e. particulate-rich, exhaust gas. The second catalytically active layer comprises rhodium as the catalytically active component and an oxygen-storing cerium/zirconium mixed oxide. This layer should be arranged such that it is in direct contact with the outgoing, i.e. low-particulate or particulate-free, exhaust gas.

Figure 1:
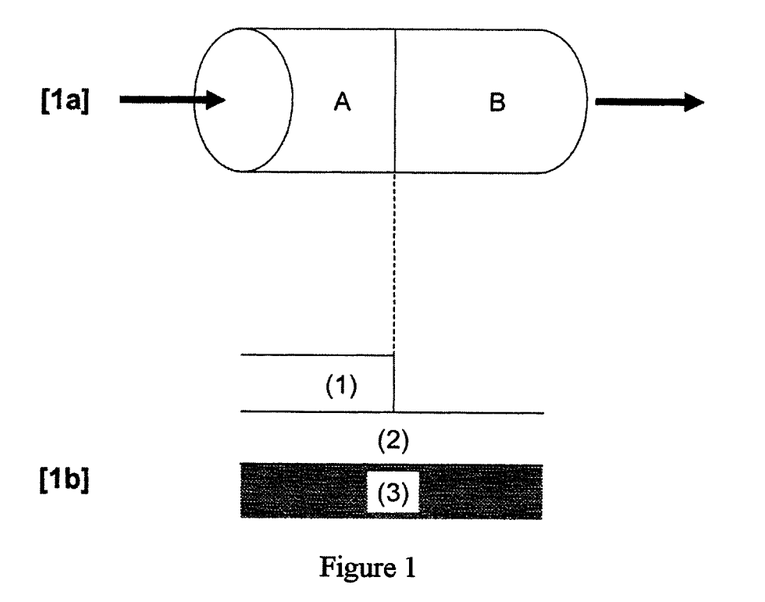

In one embodiment of the inventive particulate filter, the filter body is used as the support body for the second, rhodium-containing layer, the rhodium-containing layer occupying the entire length of the component. This filter body coated with the second, rhodium-containing layer then serves as the support body for the first, palladium-containing layer. It occupies 40 to 100% of the length of the component and is arranged on the inflow side of the component. A partial coating should be effected especially when the filter body is a flow substrate, i.e., for example, a ceramic or metallic foam structure. FIG. 1 shows a schematic of a corresponding layer arrangement in a flow filter component. Figure part [1a] shows the plan view on the overall component. The flow direction of the exhaust gas is indicated by the arrows. Zone A indicates the inflow side, zone B the outflow side of the filter. Figure part [1b] shows a schematic view of the coated wall of a flow channel, (1) denoting the palladium-containing, first layer, (2) the rhodium-containing, second layer and (3) the wall, which may be gas-tight, of the filter body.

When a ceramic wall flow filter substrate is used as the filter body, the palladium-containing coating is introduced into the inflow channels, the rhodium-containing coating into the outflow channels. In the preferred embodiments of the invention, the coating is arranged entirely or at least partly within the porous walls of the wall flow filter substrate. Such a measure contributes to minimizing the exhaust gas backpressure generated by the resulting inventive component.

Figure 2:
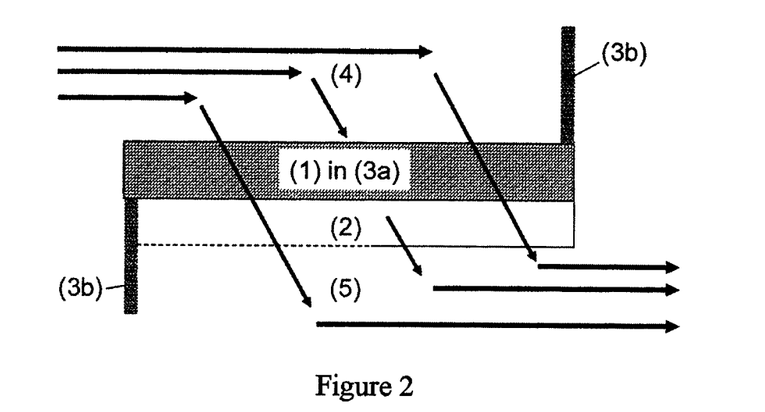

FIG. 2 shows a schematic of a preferred embodiment of the inventive particulate filter, in which the first, palladium-containing layer (1) contacted by the incoming exhaust gas is introduced over the entire length of the component into the pores of the walls of the ceramic wall flow filter substrate (3a) and is distributed homogeneously within the wall. The second layer in direct contact with the outgoing exhaust gas is applied to the wall in the outflow channels (5). It occupies 40 to 100% of the length of the component and is arranged on the outflow side. In the wall flow filter substrate, the inflow channel (4) is sealed gas-tight (3b) on the outflow side, and the outflow channel (5) on the inflow side, such that the exhaust gas is forced to pass through the porous wall. The arrows show the flow path of the exhaust gas.

Figure 3:
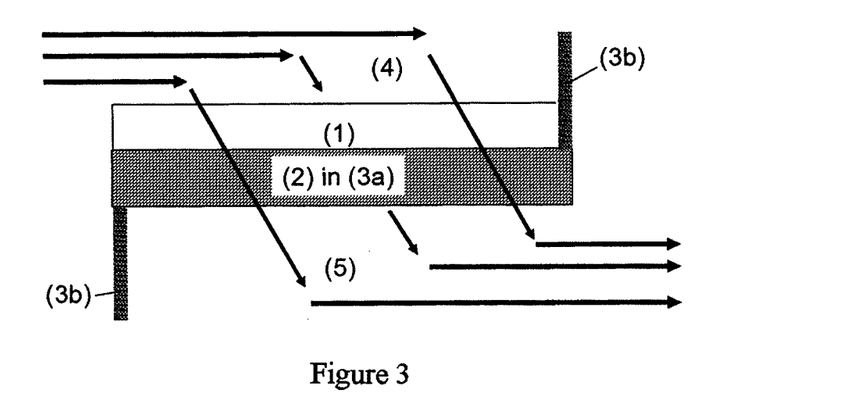

FIG. 3 shows another preferred embodiment of the inventive particulate filter, in which the second, rhodium-containing layer (2) in direct contact with the outgoing exhaust gas is introduced over the entire length of the component into the pores of the walls of a ceramic wall flow filter substrate and is distributed homogeneously within the wall. The first, palladium-containing layer (1) contacted by the incoming exhaust gas is applied to the wall within the inflow channels (4) over the entire length of the component.

Figure 4:
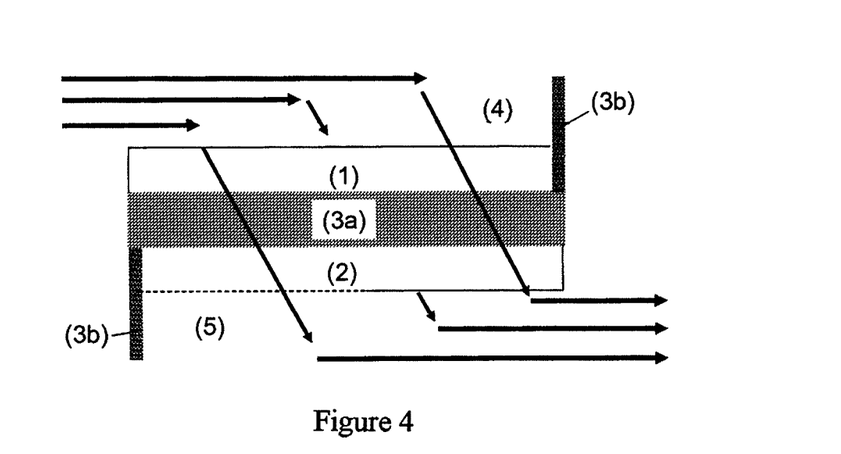

In applications in which a high three-way activity after thermal aging has priority over a minimized exhaust gas backpressure of the component, good suitability is also possessed by embodiments of the inventive particulate filter in which the first, palladium-containing layer (1) contacted by the incoming exhaust gas is applied to the wall (3a) in the inflow channels (4) over the entire length of the component, and the second layer (2) in direct contact with the outgoing exhaust gas is applied (3a) to the wall in the outflow channels (5). In this case, the second layer (2) may occupy 40 to 100% of the length of the component, in which case it must be arranged on the outflow side. Such an embodiment is shown schematically in FIG. 4.

The inventive particulate filter can be used in the embodiments described especially for removal of particulates, carbon monoxide (CO), hydrocarbons (HC) and nitrogen oxides ($NO_x$) from the exhaust gas of internal combustion engines operated with a predominantly stoichiometric air/fuel mixture. To this end, it has to be installed into the corresponding exhaust gas cleaning system of a vehicle. In order to ensure very effective, permanent soot burnoff, the inventive catalytically active particulate filter is disposed in a position close-coupled to the engine.

According to the configuration of the exhaust gas system and the untreated emission from the vehicle which is to be cleaned, it may be advantageous, in addition to the inventive particulate filter, to use a three-way catalytic converter comprising a ceramic or metallic flow substrate and a catalytically active coating. The additional three-way catalytic converter may be disposed upstream or downstream of the inventive particulate filter.

When the three-way catalytic converter is disposed upstream of the inventive particulate filter, it is advantageous when it contains less than 100 g/l of oxygen-storing cerium/zirconium mixed oxide, based on the volume of the three-way catalytic converter. Too high a content of oxygen-storing material upstream of the inventive particulate filter undesirably reduces the amount of oxidizing agent (oxygen), which is limited in any case and is required for particulate burnoff on the filter. Therefore, in the case of such an arrangement, one of the particularly preferred embodiments of the exhaust gas system is that when a three-way catalytic converter disposed upstream of the particulate filter contains less than 75 g/l of oxygen-storing cerium/zirconium mixed oxide, based on the volume of the three-way catalytic converter, with a ratio of cerium oxide to zirconium oxide between 0.35 and 0.1, more preferably between 0.25 and 0.15.

When the additional three-way catalytic converter is disposed downstream of the inventive particulate filter, the content of oxygen-storing cerium/zirconium mixed oxide can be increased in order to ensure good CO and HC conversion rates especially in slightly rich exhaust gas which may be present, for example, during the acceleration phases of the vehicle. In such an arrangement, the additional three-way catalytic converter contains preferably more than 100 g/l of oxygen-storing cerium/zirconium mixed oxide, based on the volume of the three-way catalytic converter. In such an arrangement, particular preference is given to three-way catalytic converters which contain more than 100 g/l of an oxygen-storing cerium/zirconium mixed oxide having a cerium oxide/zirconium oxide ratio between 0.4 and 1, based on the volume of the three-way catalytic converter. Most preferably, the oxygen-storing cerium/zirconium mixed oxide has, in a three-way catalytic converter arranged downstream of the inventive particulate filter, a cerium oxide/zirconium oxide ratio between 0.5 and 0.9.

In the same way as the OSC material in a three-way catalytic converter which is disposed in the inventive exhaust gas system in addition to the inventive particulate filter can ensure good CO and HC conversion rates in the case of brief loads with rich exhaust gas, it may be helpful if the additional three-way catalytic converter further comprises a nitrogen oxide storage material selected from the group of the alkali metal oxides, alkaline earth metal oxides and rare earth metal oxides or combinations thereof. Such a supplementation ensures that, in the event of brief loads of the exhaust gas system with lean exhaust gas, no undesired nitrogen oxide emissions occur.

To clean the exhaust gas of internal combustion engines operated with a predominantly stoichiometric air/fuel mixture, the exhaust gas, to remove carbon monoxide (CO), hydrocarbons (HC), nitrogen oxides ($NO_x$) and particulates, is passed through an inventive, catalytically active particulate filter. The gaseous pollutants are converted by the catalytic action of the constituents applied to the filter body to harmless exhaust gas components ($CO_2$, $N_2$, $H_2O$). The particulates present in the incoming exhaust gas are collected in the particulate filter and, in the event of a sufficient exhaust gas temperature and corresponding oxidizing agent supply, combusted directly on the filter coating. When the mass of particulates introduced into the particulate filter is greater than the amount of particulates burnt off permanently, increasing agglomeration of the particulates in the filter is accompanied by a rise in the exhaust gas backpressure. When the exhaust gas backpressure exceeds a critical value predefined in the engine control system, additional measures for particulate filter regeneration must be initiated.

The particulate filter is regenerated by passing an oxygen-rich exhaust gas through at exhaust gas temperatures of between 400 and 700° C. In the case of an engine operated with a predominantly stoichiometric air/fuel mixture, the oxygen-rich exhaust gas can be generated, for example, by means of a power cutoff. This is done by briefly interrupting the fuel supply in the cylinder with the throttle flap fully opened in the intake pipe. Such power cutoffs occur in modern, fuel-saving vehicles, for example, whenever a deceleration is undertaken by engine braking while driving. In addition, the oxygen-rich exhaust gas required to regenerate the inventive particulate filter can be generated by blowing secondary air into the exhaust gas line. Such a process embodiment is a possibility in all vehicles which already comprise a secondary air pump.

The invention is illustrated in detail by a few figures and examples.

BRIEF DESCRIPTION OF THE DRWINGS

FIGS. 1 to 4 show different coating arrangements in inventive catalytically active particulate filters. The numbers denote
(1) the first, palladium-containing layer;
(2) the second, rhodium-containing layer;
(3) the wall of the filter body;
(3a) the porous wall of a wall flow filter substrate;
(3b) the gas-tight conclusion of the flow channels in a wall flow filter substrate;
(4) an inflow channel;
(5) an outflow channel.

FIGS. 5 to 8 show the results of different tests which have been undertaken on an inventive particulate filter and prior art particulate filters. The figures show:

DETAILED EMBODIMENTS OF THE INVENTION

Production and Testing of the Particulate Filters Described in the Example and in the Comparative Examples:

To produce the catalytically active particulate filters described in the example and in the comparative examples, wall flow filter substrates made of aluminum titanate (type: Corning Duratrap AT) with oval cross section (end face diameter: 10.21 cm×19.84 cm) and a length of 17.4 cm were coated. The wall flow filter substrates had a cell density of 46.5 cells per square centimeter with a cell wall thickness of 0.33 mm. They had a porosity of 52% and a density of 3.5 kg/l, based on the volume of the filter body.

In the comparative example 1, a coating suspension was applied in the inflow channels. In the comparative example 2 and in the example, two different coating suspensions were applied in succession, and the first coating suspension was disposed in the inflow channels.

In the comparative example, the second coating was likewise disposed in the inflow channels. In the case of the inventive particulate filter (example), the second coating suspension was disposed in the outflow channels. After the application of each coating suspension, the parts were dried and calcined at 500° C. for a duration of 4 hours.

For the catalytic characterization, in each case two cylindrical drilling cores with a diameter of 2.54 cm and a length of 17.4 cm were taken from the parts thus obtained.

In each case one of the specimens thus obtained was first subjected, in the freshly produced, soot-free state, on a model gas system, to a "lambda sweep test" by the customary test methods which are familiar to those skilled in the art.

Subsequently, these parts were laden with soot in a controlled manner at room temperature. To this end, commercially available soot (manufacturer: Degussa) was fluidized by passing air through it and blowing through the filter until an amount of 5 g/l of soot based on the volume of the specimen had been introduced. The drilling cores loaded with soot were again examined in the lambda sweep test.

Before the characterization of the catalytic properties, the specimen remaining in each case was exposed over a duration of 16 hours to a temperature of 925° C. in an atmosphere containing 10% by volume of oxygen and 10% by volume of water vapor in nitrogen. The parts thus aged were likewise subjected to a lambda sweep test, loaded with 5 g/l of soot according to the method described and again examined in the lambda sweep test.

In all cases, in the lambda sweep test, the following parameters were established:

| Model gas composition | |
| --- | --- |
| CO concentration: | 1.4% by volume |
| HC concentration ($C_3H_8$:$C_3H_6$ = 2:1): | 500 ppmv |
| $NO_x$ concentration: | 1000 ppmv |
| Mean $O_2$ concentration: | 0.9% by volume |
| Lambda value: | 0.98-1.01 |
| Other test parameters | |
| Temperature upstream of catalyst: | 350° C. |
| Lambda change frequency: | 1 Hz |
| Amplitude: | 0.5 A/F |
| GHSV: | 25 000 $h^{-1}$ |

COMPARATIVE EXAMPLE 1

After dissolution of barium hydroxide in water, a cerium/zirconium mixed oxide with a cerium oxide content of 20% by weight, based on the total amount of the cerium/zirconium mixed oxide was suspended and activated with rhodium by adding rhodium nitrate solution while constantly stirring. Thereafter, alumina (specific surface area: 140 $g/m^2$) stabilized with 3% by weight of lanthanum oxide and a further cerium/zirconium mixed oxide with a cerium oxide content of 40% by weight, based on the total weight of the cerium-zirconium mixed oxide, were added to the suspension. This was followed by the addition of palladium nitrate solution with constant stirring. The resulting coating suspension was used directly to coat a wall flow filter substrate. The suspension was applied only in the inflow channels of the filter body. The coated filter was dried and calcined. The finished catalytically active particulate filter contained, in the inflow channels, a coating with the following composition:

| | |
| --- | --- |
| 14 g/l | of cerium/zirconium mixed oxide with 20% by weight of cerium oxide |
| 28 g/l | of lanthanum-stabilized aluminum oxide |
| 14 g/l | of cerium/zirconium mixed oxide with 40% by weight of cerium oxide |
| 2 g/l | of barium oxide |
| 1.236 g/l | of palladium (on all components) |
| 0.176 g/l | of rhodium (on cerium/zirconium mixed oxide with 20% by weight of $CeO_2$) |

The total noble metal loading of the catalytically active particulate filter VGPF1 thus obtained was 1.412 g/l with a ratio of palladium to rhodium of 7:1.

COMPARATIVE EXAMPLE 2

Manufacture of the First Layer

Alumina (specific surface area 140 $m^2/g$) stabilized with 3% by weight of lanthanum oxide and a cerium/zirconium mixed oxide with a cerium oxide content of 40% by weight was activated according to U.S. Pat. No. 6,103,660 using barium hydroxide as a base together with palladium originating from palladium nitrate. The resulting suspension was used directly to coat the wall flow filter substrate. The suspension was applied only in the inflow channels of the filter body. After the coating, the filter was dried and calcined. The finished first layer contained the following amounts of coating:

| | |
| --- | --- |
| 10 g/l | of lanthanum-stabilized alumina |
| 10 g/l | of cerium/zirconium mixed oxide with 40% by weight of cerium oxide |
| 1 g/l | of barium oxide |
| 1.236 g/l | of palladium (on all components) |

Manufacture of the Second Layer

A cerium/zirconium mixed oxide with a cerium oxide content of 20% by weight was suspended in water. Thereafter, an aqueous solution of rhodium nitrate was added to the suspension while constantly stirring and alumina (specific surface area: 140 $m^2/g$) stabilized with 3% by weight of lanthanum oxide was added. The wall flow filter substrate which had already been provided with the first layer in the inflow channels was coated with the second coating suspension, and the second layer was likewise introduced into the inflow channels. The filter was dried and calcined. The finished second layer contained the following amounts of coating:

| | |
| --- | --- |
| 10 g/l | of lanthanum-stabilized alumina |
| 10 g/l | of cerium/zirconium mixed oxide with 20% by weight of cerium oxide |
| 0.176 g/l | of rhodium (on cerium/zirconium mixed oxide with 20% by weight of $CeO_2$) |

The total noble metal loading of the catalytically active particulate filter VGPF2 thus produced was 1.412 g/l with a ratio of palladium to rhodium of 7:1.

EXAMPLE

Manufacture of the First Layer

Alumina (specific surface area 140 $m^2/g$) stabilized with 3% by weight of lanthanum oxide and a cerium/zirconium mixed oxide with a cerium oxide content of 40% by weight was activated according to U.S. Pat. No. 6,103,660 using barium hydroxide as a base together with palladium originating from palladium nitrate. The resulting suspension was used directly to coat the wall flow filter substrate. The suspension was applied only in the inflow channels of the filter body. After the coating, the filter was dried and calcined. The finished first layer contained the following amounts of coating:

| | |
| --- | --- |
| 14 g/l | of lanthanum-stabilized alumina |
| 14 g/l | of cerium/zirconium mixed oxide with 40% by weight of cerium oxide |
| 2 g/l | of barium oxide |
| 1.236 g/l | of palladium (on all components) |

Manufacture of the Second Layer

A cerium/zirconium mixed oxide with a cerium oxide content of 20% by weight was suspended in water. Thereafter, an aqueous solution of rhodium nitrate was added to the suspension while constantly stirring and alumina (specific surface area: 140 $m^2/g$) stabilized with 3% by weight of lanthanum oxide was added. The wall flow filter substrate which had already been provided with the first layer in the inflow channels was coated with the second coating suspension, and the second layer was only introduced into the outflow channels. The filter was dried and calcined. The finished second layer contained the following amounts of coating:

| | |
|---|---|
| 16 g/l | of lanthanum-stabilized alumina |
| 14 g/l | of cerium/zirconium mixed oxide with 20% by weight of cerium oxide |
| 0.176 g/l | of rhodium (on cerium/zirconium mixed oxide with 20% by weight of $CeO_2$) |

The total noble metal loading of the catalytically active particulate filter GPF1 thus produced was 1.412 g/l with a ratio of palladium to rhodium of 7:1.

Results of the Catalytic Characterization in the Lambda Sweep Test

As already described, in each case two cylindrical drilling cores with a diameter of 2.54 cm and a length of 17.4 cm were taken from the catalytically active particulate filters produced in the example and in the comparative examples. In each case one of the specimens was analyzed in soot-free form and laden with soot in the freshly produced state. The drilling core remaining in each case was first aged synthetically at 925° C. for a duration of 16 hours in an atmosphere containing 10% by volume of water vapor and 10% by volume of oxygen, and then analyzed in the soot-free state and in the soot-laden state.

The results of the lambda sweep test are shown in FIGS. 5 to 8.

Figure 5:
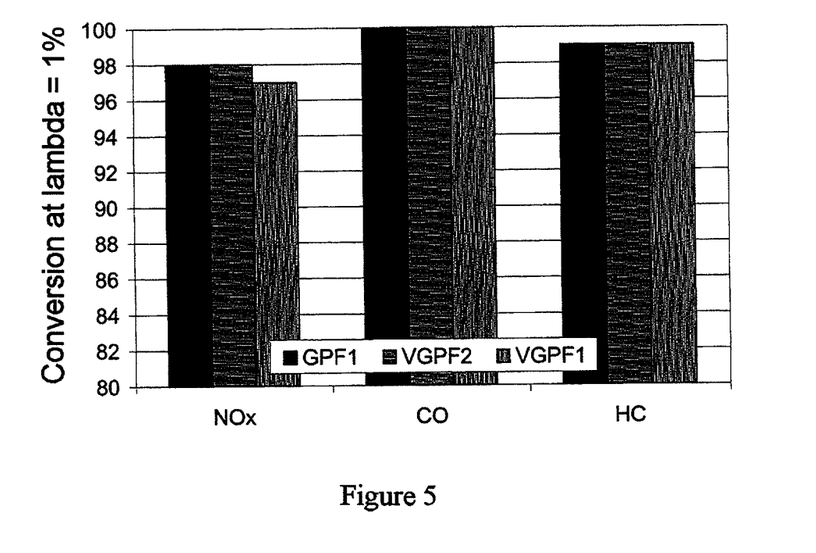
FIG. 5: HC, CO and $NO_x$ conversion at $\lambda=1$ of the inventive particulate filter GPF1 (■) in comparison to prior art particulate filters (VGPF 1 (∥) from comparative example 1—particulate filter with a catalytically active layer applied in the inflow channels; VGPF2 (=) from comparative example 2—particulate filter with a catalytically active double layer applied in the inflow channels) in the freshly produced and soot-free state
Figure 6:
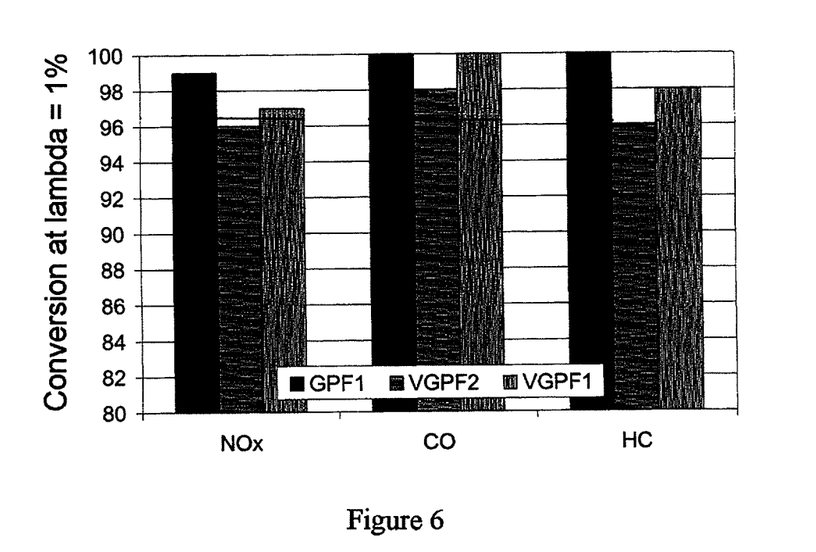
FIG. 6: HC, CO and $NO_x$ conversion at $\lambda=1$ of the inventive particulate filter GPF1 (■) in comparison to prior art particulate filters (VGPF 1 (∥) from comparative example 1—particulate filter with a catalytically active layer applied in the inflow channels; VGPF2 (=) from comparative example 2—particulate filter with a catalytically active double layer applied in the inflow channels) in the freshly produced state after application of approx. 5 g/l of soot, based on the volume of the catalytically active particulate filter

FIG. 5 shows the CO, HC and $NO_x$ conversions over the freshly produced catalytically active particulate filters at λ=1. FIG. 6 shows the corresponding conversion values after loading the catalytically active particulate filter with in each case 5 g/l of soot, based on the volume of the specimen.

It is obvious that the inventive catalytically active particulate filter GPF1 in the fresh state exhibits barely any advantages over the particulate filters VGPF1 and VGPF2 (double layer) produced according to the prior art. Only in the soot-laden state does the inventive particulate filter show slight advantages in the $NO_x$ conversion and in the HC conversion over the conventional coated particulate filters.

Figure 7:
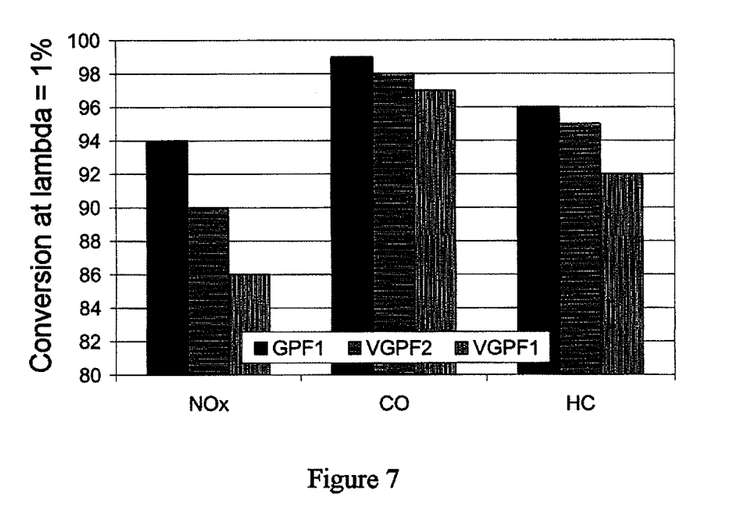
FIG. 7: HC, CO and $NO_x$ conversion at $\lambda=1$ of the inventive particulate filter GPF1 (■) in comparison to prior art particulate filters (VGPF 1 (∥) from comparative example 1—particulate filter with a catalytically active layer applied in the inflow channels; VGPF2 (=) from comparative example 2—particulate filter with a catalytically active double layer applied in the inflow channels) after hydrothermal aging in the soot-free state
Figure 8:
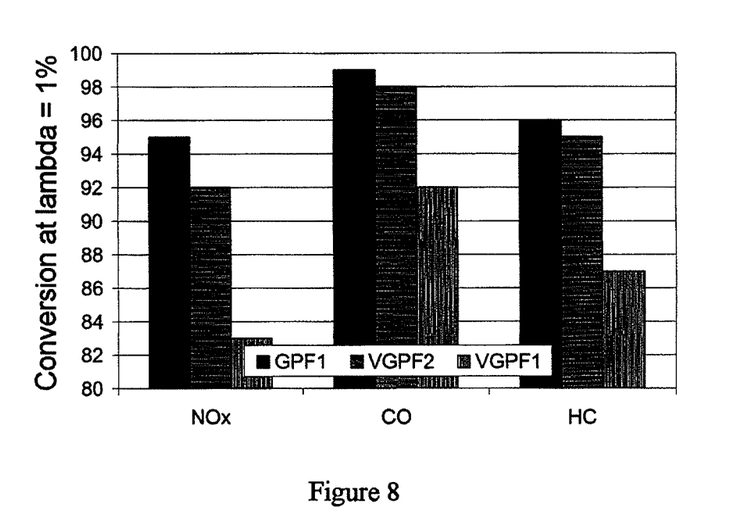
FIG. 8: HC, CO and $NO_x$ conversion at $\lambda=1$ of the inventive particulate filter GPF1 (■) in comparison to prior art particulate filters (VGPF 1 (∥) from comparative example 1—particulate filter with a catalytically active layer applied in the inflow channels; VGPF2 (=) from comparative example 2—particulate filter with a catalytically active double layer applied in the inflow channels) after hydrothermal aging and application of approx. 5 g/l of soot, based on the volume of the catalytically active particulate filter

The advantages of the inventive particulate filter are shown after thermal aging. Even in the soot-free state, significantly better pollutant gas conversions are observed. After loading with soot, the conversions of the three common pollutant gases $NO_x$, CO and HC over the inventive filter GPF1 are significantly higher than over the coated prior art particulate filters VGPF1 and VGPF2. Especially compared to the variant usually used, with a homogeneous catalytic coating VGPF1, the inventive particulate filter GPF1 shows significant advantages. For instance, the $NO_x$ conversion of the inventive GPF1, at 95%, is 12% abs. higher than that of the VGPF1. The HC conversion, at 96%, is 9% abs. above that of the VGPF1. The CO conversion of 99% is higher by 7% abs. than that of the VGPF1.

It is only the conversion advantages shown for the inventive catalytically active particulate filter in the thermally aged state that provide the prerequisites for successful use of such components for removal of particulates and the conventional pollutant gases CO, HC and $NO_x$ from the exhaust gas of internal combustion engines operated with a predominantly stoichiometric air/fuel mixture.

The invention claimed is:

1. A catalytically active particulate filter comprising a wall flow filter body, and a catalytically active coating which consists of two layers, both layers comprising an active alumina, arranged such that when an exhaust gas flows through the wall flow filter body, the first layer is in direct contact with the incoming exhaust gas and the second layer is in direct contact with the outgoing exhaust gas having been contacted with the first layer, wherein the alumina in the first layer is catalytically activated with palladium, while the second layer comprises rhodium as a catalytically active component and additionally an oxygen-storing cerium/zirconium mixed oxide.

2. The catalytically active particulate filter according to claim 1, wherein the first layer does not comprise any oxygen-storing cerium/zirconium mixed oxide.

3. The catalytically active particulate filter according to claim 2, wherein the cerium/zirconium mixed oxide in the second layer is stabilized with 1 to 15% by weight of metal oxides, based on the total weight of the mixed oxide, the oxides being those of the metals selected from the group consisting of iron, manganese, titanium, silicon, tin, yttrium, lanthanum, praseodymium, neodymium, samarium or mixtures.

4. The catalytically active particulate filter according to claim 3, wherein the cerium/zirconium mixed oxide in the second layer has a weight ratio of cerium oxide to zirconium oxide of 1 to 0.1.

5. The catalytically active particulate filter according to claim 1, wherein the active alumina of the first and second layers is stabilized in each case with 1 to 10% by weight of lanthanum oxide, based on the total weight of the alumina.

6. The catalytically active particulate filter according to claim 5, wherein the active alumina in the first layer is additionally surface coated with strontium oxide or barium oxide.

7. The catalytically active particulate filter according to claim 6, wherein the first layer additionally comprises lanthanum oxide or neodymium oxide.

8. The catalytically active particulate filter according to claim 1, wherein the concentration of the palladium in the first layer, based on the volume of the particulate filter, is between 0.1 and 10 g/l.

9. The catalytically active particulate filter according to claim 8, wherein the active alumina in the first layer is additionally catalytically activated with platinum, and the concentration of the platinum based on the volume of the particulate filter is 0.01 to 10 g/l.

10. The catalytically active particulate filter according to claim 1, wherein the concentration of the rhodium in the second layer based on the volume of the particulate filter is between 0.01 and 1 g/l.

11. The catalytically active particulate filter according to claim 10, wherein, in the second layer, the active alumina and/or the oxygen-storing cerium/zirconium mixed oxide is additionally catalytically activated with platinum, and the concentration of the platinum based on the volume of the particulate filter is 0.01 to 10 g/l.

12. The catalytically active particulate filter according to claim 10, wherein the second layer additionally comprises zirconium oxide.

13. The catalytically active particulate filter according to claim 12, wherein the zirconium oxide is stabilized with 1 to 30% by weight of rare earth metal oxide, based on the total weight of the zirconium oxide.

14. The catalytically active particulate filter according to claim 13, wherein the zirconium oxide contains not more than 15% by weight of cerium oxide, based on the total weight of the stabilized zirconium oxide.

15. The catalytically active particulate filter according to claim 1, wherein the filter body is a ceramic wall flow filter substrate.

16. The catalytically active particulate filter according to claim 15, wherein the ceramic wall flow filter substrate has walls having an open-pore structure with a porosity of 40 to 80% and a mean pore diameter of 9 to 30 micrometers.

17. The catalytically active particulate filter according to claim 16, wherein the first layer contacted by the incoming exhaust gas is introduced over the entire length of the component into the pores of the walls of the ceramic wall flow filter substrate and is distributed homogeneously within the wall, and the second layer in direct contact with the outgoing exhaust gas is applied to the wall in the outflow channels.

18. The catalytically active particulate filter according to claim 17, wherein the second layer in direct contact with the outgoing exhaust gas occupies 40 to 100% of the length of the component and is arranged on the outflow side.

19. The catalytically active particulate filter according to claim 16, wherein the second layer in direct contact with the outgoing exhaust gas is introduced over the entire length of the component into the pores of the walls of the ceramic wall flow filter substrate and is distributed homogeneously within the wall, and the first layer contacted by the incoming exhaust gas is applied to the wall in the inflow channels over the entire length of the component.

20. The catalytically active particulate filter according to claim 16, wherein the first layer contacted by the incoming exhaust gas is applied to the wall in the inflow channels over the entire length of the component, and the second layer in direct contact with the outgoing exhaust gas is applied to the wall in the outflow channels.

21. The catalytically active particulate filter according to claim 20, wherein the second layer in direct contact with the outgoing exhaust gas occupies 40 to 100% of the length of the component and is arranged on the outflow side.

22. The catalytically active particulate filter according to claim 1, wherein the filter body serves as a support body for the second, rhodium-containing layer occupying the entire length of the component, and wherein the filter body provided with the second, rhodium-containing layer serves as a support body for the first, palladium-containing layer.

23. The catalytically active particulate filter according to claim 22, wherein the first, palladium-containing layer occupies 40 to 100% of the length of the component and is arranged on the inflow side of the component.

24. A method for removing particulates, carbon monoxide (CO), hydrocarbons (HC) and nitrogen oxides ($NO_x$) from the exhaust gas of internal combustion engines operated with a predominantly stoichiometric air/fuel mixture, which comprises contacting the exhaust gas with the catalytically active particulate filter according to claim 1.

25. The emission control system according to claim 24, wherein the catalytically active particulate filter is disposed in a position close-coupled to the engine.

26. An emission control system for controlling the emissions of internal combustion engines operated with a predominantly stoichiometric air/fuel mixture, comprising a catalytically active particulate filter according to claim 1.

27. The emission control system according to claim 26, wherein a three-way catalytic converter comprising a ceramic or metallic flow substrate and a catalytically active coating is present upstream or downstream of the particulate filter.

28. The emission control system according to claim 27, wherein the three-way catalytic converter is disposed upstream of the particulate filter and contains less than 100 g/l of oxygen-storing cerium/zirconium mixed oxide, based on the volume of the three-way catalytic converter.

29. The emission control system according to claim 27, wherein the three-way catalytic converter is disposed downstream of the particulate filter and contains more than 100 g/l of oxygen-storing cerium/zirconium mixed oxide, based on the volume of the three-way catalytic converter.

30. The emission control system according to claim 28, wherein the three-way catalytic converter additionally comprises a nitrogen oxide storage material selected from the group of the alkali metal oxides, alkaline earth metal oxides and rare earth metal oxides, and combinations thereof.

31. A process for controlling emissions from internal combustion engines operated with a predominantly stoichiometric air/fuel mixture, which comprises passing exhaust gas having carbon monoxide (CO), hydrocarbons (HC), nitrogen oxides ($NO_x$) and particulates through a catalytically active particulate filter according to claim 1.

32. The process according to claim 31, wherein the particulate filter is regenerated by passing an oxygen-rich exhaust gas through at exhaust gas temperatures between 400 and 700° C.

33. The process according to claim 32, wherein the oxygen-rich exhaust gas is generated by means of a power cutoff.

34. The process according to claim 32, wherein the oxygen-rich exhaust gas is generated by blowing secondary air into the exhaust gas line.

* * * * *